US011022104B2

(12) United States Patent
Deck et al.

(10) Patent No.: US 11,022,104 B2
(45) Date of Patent: Jun. 1, 2021

(54) GAS INLET FOR AN ION THRUSTER (71) Applicant: ArianeGroup GmbH, Taufkirchen (DE)

(72) Inventors: Joël Deck, Neudenau (DE); Bernd Pfeiffer, Moeckmuehl (DE)

(73) Assignee: ArianeGroup GmbH, Taufkirchen (DE)

(*) Notice: Subject to any disclaimer, the term of this patent is extended or adjusted under 35 U.S.C. 154(b) by 540 days.

(21) Appl. No.: 15/826,351

(22) Filed: Nov. 29, 2017

(65) Prior Publication Data

US 2018/0149144 A1 May 31, 2018

(30) Foreign Application Priority Data

Nov. 30, 2016 (DE) ..................... 10 2016 223 746.2

(51) Int. Cl.
*F03H 1/00* (2006.01)
*C04B 38/00* (2006.01)

(52) U.S. Cl.
CPC ....... *F03H 1/0012* (2013.01); *C04B 38/0074* (2013.01); *F03H 1/0043* (2013.01)

(58) Field of Classification Search
CPC .................................................. F03H 1/0012
See application file for complete search history.

(56) References Cited

U.S. PATENT DOCUMENTS

| 9,242,747 B1* | 1/2016 | Burton ................. B64G 1/405 |
| 2008/0220596 A1 | 9/2008 | Olander et al. |
| 2010/0178775 A1 | 7/2010 | Okesaku et al. |
| 2010/0244657 A1 | 9/2010 | Guyot et al. |

(Continued)

FOREIGN PATENT DOCUMENTS

| DE | 1 826 458 U | 2/1961 |
| DE | 10 2013 008 140 A1 | 11/2014 |

(Continued)

OTHER PUBLICATIONS

European Search Report issued in European counterpart application No. 17201563.8-1203 dated Apr. 24, 2018 (Nine (9) pages).

(Continued)

*Primary Examiner* — Gerald L Sung
*Assistant Examiner* — William L Breazeal
(74) *Attorney, Agent, or Firm* — Crowell & Moring LLP (57) ABSTRACT A gas inlet (10), in particular for use in an ion thruster, comprises a housing (12) which is made of a gas-tight ceramics material and which is provided with a first gas feed channel (14) and a second gas feed channel (16) arranged downstream of the first gas feed channel (14). The gas inlet (10) further comprises an insert (18) which is arranged in the second gas feed channel (16) and is made of a porous ceramics material, wherein the geometry and pore structure of the insert (18) are such that the insert (18) forms a desired flow resistance for a gas stream flowing through the second gas feed channel (16) which is greater than a flow resistance acting on a gas stream flowing through the first gas feed channel (14), and wherein a ratio of a length (11) of the first gas feed channel (14) to a length (13) of the insert (18) is at least 1:2.

10 Claims, 6 Drawing Sheets (56) References Cited

U.S. PATENT DOCUMENTS

2011/0089836 A1* 4/2011 Harmann .................. H01J 5/02

FOREIGN PATENT DOCUMENTS

EP        3 239 519 A1    11/2017
RU       2 410 742 C1    1/2011

OTHER PUBLICATIONS

German Office Action issued in German counterpart application No. 10 2016 223 746.2 dated Aug. 1, 2017 (Three (3) pages).
Yavuz et al., "Prototype Design and Manufacturing Method of an 8 cm Diameter RF ion Thruster", *2013 6th International Conference on Recent Advances in Space Technologies (RAST)*, 2013, pp. 619-624.
European Office Action issued in European application No. 17 201 563.8-1203 dated Jun. 22, 2020 (Seven (7) pages).

* cited by examiner

Fig. 6

GAS INLET FOR AN ION THRUSTER

CROSS REFERENCE TO RELATED APPLICATIONS

This application claims priority under 35 U.S.C. § 119 to German Patent Application No. 10 2016 223 746.2, filed Nov. 30, 2016, the entire disclosure of which is herein expressly incorporated by reference.

BACKGROUND AND SUMMARY OF THE INVENTION

The present invention relates to a gas inlet suitable for use in an ion thruster. The invention relates further to a method for producing such a gas inlet. Finally, the invention relates to an ion thruster equipped with such a gas inlet.

Ion thrusters used as propulsion for spacecraft generate thrust, and thus driving power, in that a fuel gas, such as, for example, xenon, is first ionized, and the gas particles are then accelerated in an electric field. By means of a neutralizer, the accelerated gas particles are electrically neutralized and finally ejected in the form of a jet at a speed of from 10 to 130 km/s. A gas inlet, via which fuel gas, which flows through a fuel gas line connected to a fuel gas tank, is fed into the ion thruster, must ensure a defined inflow of the fuel gas into the thruster in order to allow the fuel gas to be distributed evenly in the thruster. Furthermore, the gas inlet must have a defined flow resistance and a defined insulation distance in order to ensure that plasma generated in the thruster does not flash over into the fuel gas line. This flow resistance should also remain as constant as possible in the case of a large number of thermal cycles to which the gas inlet is subjected in the course of its operating life.

Gas inlets currently fitted in ion thrusters comprise a plurality of components which are mounted in several steps. In a first step, a gas inlet housing is manufactured, into which a first sintered filter is then introduced. Glass beads or quartz sand particles having a diameter of less than 0.2 mm are then introduced into the gas inlet housing and compacted by means of a vibrating plate. The glass beads or quartz sand particles serve to establish the desired flow resistance of the gas inlet. A second sintered filter is then introduced. The sintered filters prevent the glass beads or quartz glass particles from falling out of the gas inlet housing. Finally, a cover is soldered to the gas inlet housing. The cover is provided with a gas inlet opening via which the fuel gas is fed into the gas inlet housing filled with glass beads or quartz sand particles.

Gas inlets currently fitted in ion thrusters comprise a plurality of components which are mounted in several steps. In a first step, a gas inlet housing is manufactured, into which a first sintered filter is then introduced. Glass beads or quartz sand particles having a diameter of less than 0.2 mm are then introduced into the gas inlet housing and compacted by means of a vibrating plate. The glass beads or quartz sand particles serve to establish the desired flow resistance of the gas inlet. A second sintered filter is then introduced. The sintered filters prevent the glass beads or quartz glass particles from falling out of the gas inlet housing. Finally, a cover is soldered to the gas inlet housing. The cover is provided with a gas inlet opening via which the fuel gas is fed into the gas inlet housing filled with glass beads or quartz sand particles.

The object underlying the present invention is to provide a gas inlet which is suitable in particular for use in an ion thruster, which gas inlet can be produced simply and inexpensively and has a long service life under the operating conditions prevailing in an ion thruster. Furthermore, the gas inlet is to be usable particularly reliably and flexibly and is to have a space-saving construction. Finally, the invention is directed at the object of providing a method for producing such a gas inlet, and an ion thruster equipped with such a gas inlet.

These objects are achieved by a gas inlet having the features of claim 1, a method having the features of claim 10, and an ion thruster having the features of claim 15.

A gas inlet suitable in particular for use in an ion thruster comprises a housing made of a gas-tight ceramics material. Manufacturing the housing from a gas-tight material ensures that gas fed into the housing cannot escape from the housing in an uncontrolled manner. The housing is provided with a first gas feed channel and a second gas feed channel arranged downstream of the first gas feed channel. The terms "downstream" and "upstream" here refer to a direction of flow of a gas stream flowing through the gas inlet.

The gas inlet further comprises an insert arranged in the second gas feed channel, which insert is made of a porous ceramics material and is preferably in one piece. The insert preferably has a shape which is matched to the shape of the second gas feed channel. For example, the second gas feed channel can have a hollow cylindrical shape, whereby the insert can correspondingly have a cylindrical shape. The second gas feed channel and/or the insert are preferably in such a form that the longitudinal central axis thereof coincides with a longitudinal axis of the gas inlet. Since both the housing and the insert of the gas inlet are made of a ceramics material, the gas inlet is distinguished by high resistance at high temperatures. The geometry and pore structure of the insert are such that the insert forms a desired flow resistance for a gas stream flowing through the second gas feed channel which is greater than a flow resistance acting on a gas stream flowing through the first gas feed channel. The gas inlet is in such a form that a ratio of a length of the first gas feed channel to a length of the insert is at least 1:2. The dimension "length" refers to the extent of the components of the gas inlet in the direction of flow of the gas stream flowing through the gas inlet. In other words, the length of the first gas feed channel is at least half the length the insert. Preferably, the length of the first gas feed channel is greater than half the length of the insert. The length of the insert preferably corresponds substantially to a length of the second gas feed channel. Alternatively, the length of the insert can be smaller than the length of the second gas feed channel.

Compared to conventional arrangements, the gas inlet can be manufactured from significantly fewer individual parts. In particular, it is not necessary to use glass beads or quartz sand particles to establish a desired flow resistance for a gas stream flowing through the gas inlet. Instead, the flow resistance can be established very precisely in the gas inlet in a simple manner by the insert made of a porous ceramics material. The production of the gas inlet thereby requires fewer steps with shorter processing times, which results in lower production costs. A further advantage of the gas inlet is that, owing to the use of the insert made of a porous ceramics material having high temperature resistance, the gas inlet has a substantially constant flow resistance for a gas stream guided through the gas inlet even after a large number of thermal cycles. As a result, when the gas inlet is used in an ion thruster, it can reliably be ensured over the entire lifetime of the gas inlet that plasma generated in the ion thruster, in particular in a reaction chamber of the ion thruster arranged downstream of the gas inlet, does not flash over into a fuel gas line connected to the gas inlet.

In order reliably to prevent the plasma generated in the reaction chamber of the ion thruster from flashing over into the fuel line arranged upstream of the gas inlet, the gas inlet, as already described above, must have a defined flow resistance and a defined insulation distance. This relationship is described by Paschen's law, which describes the dependency of the breakdown voltage in a homogeneous field on a product of the gas pressure and the electrode gap. The pressure drop in the gas stream flowing through the gas inlet induced by the flow resistance in the gas inlet thereby corresponds to the gas pressure according to Paschen's law. Furthermore, the insulation distance of the gas inlet corresponds to the electrode gap according to Paschen's law. The insulation distance of the gas inlet refers specifically to a path length of the gas stream through the gas inlet, that is to say a path length of the gas stream from the, usually metallic, fuel line connected upstream to the gas inlet to the plasma-generating reaction chamber of the ion thruster connected downstream to the gas inlet in a state of the gas inlet mounted in the ion thruster.

In the gas inlet described here, the flow resistance for the gas stream flowing through the gas inlet is preferably generated predominantly by the insert. In other words, the flow resistance generated by the insert arranged in the second gas feed channel for a gas stream flowing through the second gas feed channel is preferably significantly greater than the flow resistance acting on the gas stream flowing through the first gas feed channel. This can be achieved in that the insert extends only along the second gas feed channel. Accordingly, a further insert made of a porous material through which the gas stream flowing through the gas inlet can flow is preferably not provided in the first gas feed channel.

The pressure drop in the gas stream flowing through the gas inlet, and thus the flow resistance for the gas stream flowing through the gas inlet, depends substantially on the geometry, in particular the length and cross-sectional area, of the insert and on the pore structure, in particular the porosity, the pore shape and the mean pore diameter, of the porous ceramics material used to produce the insert. Consequently, the length and cross-sectional area of the insert and also the porosity and mean pore diameter of the porous ceramics material used to produce the insert must be so chosen and adapted to one another that the desired pressure drop is established in the gas stream flowing through the insert. The length of the insert can be in the region of the length of conventional gas inlets with a glass bead filling. Accordingly, in particular the cross-sectional area of the insert as well as the porosity and mean pore diameter of the porous ceramics material used to produce the insert can be varied and adapted to one another in order to establish the pressure drop in the gas stream flowing through the gas inlet, and thus the flow resistance for the gas stream flowing through the gas inlet, as desired.

Preferably, the geometry and pore structure of the insert are such that the insert generates a flow resistance in the gas inlet that substantially corresponds to the flow resistance or is slightly greater than the flow resistance that is achieved in a conventional gas inlet by a most dense glass bead packing of approximately 74 vol. %. Consequently, the gas inlet can be manufactured with a similar geometry to conventional gas inlets. As a result, the gas inlet can be used in ion thrusters without adjustments having to be made to the geometry of the ion thrusters. The pore structure of the insert can optionally be so adapted that the insert, as compared with the most dense conventional glass bead packing, has a length through which flow is possible that is approximately 5 to 10% shorter, that is to say a dimension in a direction parallel to a direction of flow of a gas through the gas inlet that is approximately 5 to 10% shorter. The gas inlet can then be of particularly space-saving form.

The insulation distance of the gas inlet described herein is formed at least in part by the first gas feed channel and the second gas feed channel. Preferably, however, the insulation distance is defined substantially by the sum of the length of the first gas feed channel and the length of the second gas feed channel.

Because the gas inlet comprises the first gas feed channel, it has a section with a low flow resistance, along which the insert preferably does not extend. Owing to this form of the gas inlet, breakdown of the plasma in the gas inlet can be prevented particularly reliably, without substantially increasing the pressure drop in the gas stream flowing through the gas inlet.

The provision of the first gas feed channel further allows the insulation distance of the gas inlet to be increased without thereby increasing the length of the insert, which would result in an increase in the pressure drop in the gas stream flowing through the gas inlet. Accordingly, the design parameters relevant for preventing breakdown of the plasma in the gas inlet, namely the insulation distance and the flow resistance, can be established independently of one another in the gas inlet. Thus, for example, a gas inlet can be provided which has a comparatively low flow resistance, while the insulation distance is comparatively long. Such a gas inlet has the advantageous effect that it has a low pressure drop even in the case of comparatively high fuel throughputs through the gas inlet, and at the same time particularly reliably prevents a breakdown of the plasma in the gas inlet. This can accordingly be operated reliably and efficiently both in operating states of high fuel throughput and in operating states of low fuel throughput of the ion thruster. As a result, a flexibly usable gas inlet can thus be provided.

For adapting the design parameters of the gas inlet, in particular of the first gas feed channel, the second gas feed channel and the insert, Paschen's law can be used. In particular, the first gas feed channel, the second gas feed channel and the insert can be in such a form that, at a given breakdown voltage, a product of a pressure drop in the gas stream flowing through the gas inlet and an electrode gap formed by a sum of the length of the first gas feed channel and the length of the second gas feed channel lies within a predetermined range. The geometry of the first gas feed channel and of the second gas feed channel can be such that a desired electrode gap is formed in the gas inlet. The electrode gap so formed can have a value of, for example, between 200 mm and 300 mm. Furthermore, the first gas feed channel and the second gas feed channel can have such a geometry and such properties, such as, for example, a defined surface structure on the inner surfaces thereof that are in contact with the gas stream flowing through the gas inlet, and the insert can have such a geometry and such a pore structure that a desired pressure drop is generated in the gas stream flowing through the gas inlet. The pressure drop so generated can be, for example, in the region of 300 mbar. Alternatively, the pressure drop so generated can also be greater than or less than 300 mbar.

In a preferred embodiment, the first gas feed channel, the second gas feed channel and the insert are in such a form that, at a given breakdown voltage, the product of the pressure drop in the gas stream flowing through the gas inlet and the electrode gap formed by the sum of the length of the first gas feed channel and the length of the second gas feed channel is either smaller than a lower threshold value or greater than an upper threshold value.

A range of the product of the pressure drop in the gas stream flowing through the gas inlet and the electrode gap formed by the sum of the length of the first gas feed channel and the length of the second gas feed channel that lies, at a given breakdown voltage, between the lower threshold value and the upper threshold value is preferably a range which is suitable for permitting ignition of a fuel gas fed to the ion thruster by means of the gas inlet.

In a preferred embodiment of the gas inlet, the first gas feed channel opens into the second gas feed channel. The fuel fed to the gas inlet can thus be fed to the second gas feed channel and to the insert arranged therein via the first gas feed channel. For that purpose, the first gas feed channel can have a gas outlet opening for removing a fuel gas from the first gas feed channel, via which gas outlet opening the fuel gas leaving the first gas feed channel can be fed to the second gas feed channel. The gas outlet opening of the first gas feed channel is preferably arranged concentrically to the second gas feed channel and the insert arranged therein. The gas outlet opening of the first gas feed channel can additionally be arranged at a certain distance from the insert in the second gas feed channel, so that a gap is formed between the insert and the gas outlet opening of the first gas feed channel. For example, the gap can be provided by making the length of the insert less than the length of the second gas feed channel. This gap allows the fuel gas guided into the second gas feed channel to be guided evenly into the insert arranged in the second gas feed channel. In other words, the fuel gas can thus be guided into the insert in such a manner that it is evenly distributed over the entire cross-section of the insert.

The gas inlet is preferably in such a form that the ratio of the length of the first gas feed channel to the length of the insert and/or a ratio of the length of the first gas feed channel to the length of the second gas feed channel is/are in the region of 6:1. In one embodiment of the gas inlet, the length of the first gas feed channel can be substantially 180 mm. Accordingly, the length of the insert and/or the length of the second gas feed channel can be substantially 30 mm. Alternatively, the ratio of the length of the first gas feed channel to the length of the insert and/or the ratio of the length of the first gas feed channel to the length of the second gas feed channel can be greater than or less than 6:1.

In a further development of the gas inlet, the first gas feed channel can be bent in the housing, the gas stream flowing through the first gas feed channel preferably flowing at least in part substantially perpendicularly to the longitudinal axis of the gas inlet. For example, the first gas feed channel can have a meandering geometry at least in part.

Such a form of the first gas feed channel allows the gas inlet to be provided with a compact construction even in the case of a desired long insulation distance of the gas inlet. Furthermore, a first gas feed channel of such a form allows a breakdown of the plasma in the gas inlet to be prevented reliably in particular when the gas inlet is used in a high-frequency ion thruster, that is to say in an ion thruster which is not operated with direct-current voltage.

In a particularly space-optimized form of the gas inlet, the first gas feed channel can define at least in part a flow plane with at least one bent flow section. The flow plane is preferably arranged perpendicularly to the longitudinal axis of the gas inlet and can have a plurality of bent flow sections with different and/or substantially constant radii of curvature. The first gas feed channel can be in such a form that the gas stream flowing along the flow plane in the first gas feed channel is diverted several times, so that it changes its direction of flow relative to the longitudinal axis of the gas inlet, that is to say its direction of flow within the flow plane, several times. Specifically, the flow sections in the flow plane defined by the first gas feed channel can be in meandering form. Alternatively or in addition, flow sections of the first gas feed channel running parallel to one another in the flow plane can be in such a form that the gas stream flowing through the first gas feed channel flows through those flow sections in opposite directions.

The housing of the gas inlet preferably comprises a housing base body and a housing cover fitted thereto. The housing base body preferably has a first end face and a second end face arranged opposite thereto, which end faces are preferably arranged perpendicularly to the longitudinal axis of the gas inlet. The housing cover can be fitted to the first end face of the housing base body, so that an end face of the housing cover rests on the first end face of the housing base body. The housing cover can in particular be fitted to the housing base body by glazing or adhesive bonding.

The first gas feed channel is preferably formed at least in part in the housing cover. For example, the housing cover can be provided along its end face with a groove which, together with the first end face of the housing base body, on which the end face of the housing cover can rest, can form a section of the first gas feed channel. The groove formed along the end face, together with the first end face of the housing base body, can form in particular a section of the first gas feed channel that forms the flow plane. The housing cover can further be provided with a gas inlet opening for feeding the fuel gas from a fuel line into the first gas feed channel. Accordingly, the gas inlet opening formed in the housing cover can be connected to the fuel line which can be provided for providing the fuel gas to be fed to the gas inlet. The gas inlet opening formed in the housing cover preferably forms a gas inlet opening of the first gas feed channel.

The second gas feed channel is preferably formed in the housing base body. The first end face of the housing base body can be provided with a gas inlet opening of the second gas feed channel, via which the fuel gas discharged from the gas outlet opening of the first gas feed channel can be fed to the second gas feed channel. The housing cover is preferably so fitted to the first end face of the housing base body that it rests thereon without a gap and the gas outlet opening of the first gas feed channel is connected to the gas inlet opening of the second gas feed channel. The housing cover can form a projection on its end face, in particular an annular projection, which in an assembled state of the housing cover and of the housing base body projects into the housing base body. The projection, in particular the annular projection, can be in such a form that in the fitted state of the housing cover and the housing base body it rests with an outer side face on an inner surface, in particular lateral surface, of the second gas feed channel.

The housing base body is further provided with at least one gas outlet opening, connected to the second gas feed channel, for removing the fuel gas from the gas inlet. In a preferred embodiment of the gas inlet, the at least one gas outlet opening is formed in a lateral surface of the housing base body. Through the gas outlet opening, fuel gas which has been fed to the gas inlet via the gas inlet opening of the housing cover can be discharged in a defined manner from the gas inlet after it has flowed through the porous insert. The at least one gas outlet opening of the housing base body can be connected to the second gas feed channel via an annular channel formed in the housing base body downstream of the second gas feed channel.

The at least one gas outlet opening is preferably arranged in the region of an edge of the housing base body opposite the housing cover. For example, the at least one gas outlet opening can be positioned in the lateral surface of the housing adjacent to a bottom of the housing base body. Such an arrangement of the at least one gas outlet opening of the housing base body ensures that fuel gas fed via the gas inlet opening of the housing cover flows through the entire length of the porous insert through which flow is possible before the fuel gas leaves the gas inlet via the gas outlet opening.

In a particularly preferred variant of the gas inlet, a plurality of gas outlet openings is formed in the lateral surface of the housing base body in the region of the edge of the housing base body opposite the housing cover. The plurality of gas outlet openings can be distributed evenly in the peripheral direction of the lateral surface of the housing. Such an arrangement of the gas outlet openings allows the fuel gas to be fed particularly evenly into the reaction chamber of an ion thruster equipped with the gas inlet.

The housing can be made of AL300® from Wesgo Ceramic GmbH. This material contains 97.6% aluminum oxide.

The insert can be made of AL1009® from Wesgo Ceramic GmbH. This material contains 99.8% aluminum oxide. Alternatively, the insert can be made of the material aluminum-oxide-based HalFoam™ supplied by Morgan Advanced Materials.

If the insert is made of AL1009®, the porosity of the insert can be, for example, in a range of approximately from 10 to 30 vol. %, preferably in a range of approximately from 15 to 25 vol. % and particularly preferably in a range of approximately from 16 to 22 vol. %. By contrast, an insert manufactured from HalFoam™ can have a porosity of approximately from 70 to 90 vol. %, preferably of 77 vol. % at a mean pore size of 75 µm.

Preferably, the insert is seated in the housing without a gap. In particular, the insert can be seated in the housing in such a manner that an outer side of the insert, in particular in the region of a lateral surface of the insert, abuts an inner side of the housing. Furthermore, the insert is preferably so seated in the housing that the insert does not protrude beyond a housing edge in the region of an open second end face of the housing. As a result, the desired flow resistance of the gas inlet can be established particularly precisely.

In addition or alternatively, the insert is preferably seated in the housing without additional material, that is to say without using an additional adhesive or a glaze. This ensures that the flow resistance of the gas inlet remains the same over the entire lifetime, because outgassing of the adhesive, or penetration of the glaze into the porous insert, is not possible. As will be explained in greater detail hereinbelow, the seating of the insert in the housing without a gap and without additional material can be effected by jointly baking a suitably dimensioned housing green body made of a suitable material, for example AL300®, and a suitably dimensioned insert body made of a suitable material, for example AL1009® or aluminum-oxide-based HalFoam™.

In a method for producing a gas inlet which is suitable in particular for use in an ion thruster, a housing green body having a first gas feed channel and a second gas feed channel arranged downstream of the first gas feed channel is produced. An insert body is further produced. The insert body is inserted into the second gas feed channel of the housing green body. Finally, the housing green body and the insert body are jointly baked, wherein the baking cycle is so chosen that the housing green body sinters to form a housing made of a gas-tight ceramics material, and an insert arranged in the housing and made of a porous ceramics material is produced from the insert body. After baking, the geometry and pore structure of the insert are such that the insert forms a desired flow resistance for a gas stream flowing through the insert which is greater than a flow resistance acting on a gas stream flowing through the first gas feed channel, a ratio of a length of the first gas feed channel to a length of the insert being at least 1:2.

Consequently, in the method for producing a gas inlet, only a joint baking step is required in order on the one hand to sinter the housing green body to form a gas-tight housing and on the other hand to produce an insert having a defined geometry and pore structure from the insert body.

In one embodiment of the method, the insert body is an insert green body which, when the housing green body and the insert body are jointly baked, sinters to form the insert arranged in the housing and made of a porous ceramics material. Depending on the materials used to produce the housing and the insert, the geometry and pore structure of the green bodies can be adapted accordingly in order to ensure that the housing green body is sintered by the baking operation to form a gas-tight housing, while the insert still has the desired defined geometry and pore structure even after baking. Likewise, the baking cycle, that is to say the baking temperature, the baking time, the rate of heating and any holding times at a specific holding temperature, can be varied in dependence on the materials used to produce the housing and the insert and also in dependence on the properties of the housing green body and of the insert body in the form of an insert green body, in order to ensure that the housing green body is sintered by the baking operation to form a gas-tight housing, while the insert still has the desired defined geometry and pore structure even after baking. The housing green body and the insert body in the form of an insert green body can experience different degrees of contraction during the joint baking operation.

The housing green body and/or the insert body in the form of an insert green body is/are preferably produced by cold isostatic pressing. By adapting the pressing power during cold isostatic pressing it is possible to influence the pore structure of the green bodies, and thus the contraction of the green bodies, as desired during baking. Further parameters which can be varied in order to adjust the contraction of the housing green body and/or of the insert body in the form of an insert green body include the specific surface area and thus sintering activity of the raw material (e.g. calcined clay), the calcination temperature, the grain size distribution of the raw material, the quantity and nature of the organic binders added to the raw material, the quantity and nature of the additives added to the raw material, such as, for example, $SiO_2$, MgO, CaO and further oxides, the grain size distribution of the spray granules produced from raw material, organic binders and additives, and the component size.

In an alternative embodiment of the method, the insert body is a pre-baked insert body whose geometry and pore structure remain substantially the same when the housing green body and the insert body are jointly baked. The use of a pre-baked insert body whose material properties remain substantially unchanged when the housing green body and the insert body are jointly baked has the advantage that only the contraction of the housing green body then has to be so controlled that the housing green body sinters to form the desired housing made of a gas-tight ceramics material. This facilitates the control of the process parameters and in particular the control of the baking cycle for the joint baking of the housing green body and of the insert body.

In a preferred embodiment of the method for producing a gas inlet, the housing green body is machined prior to baking. For example, the first and second gas feed channels or at least one gas outlet opening for removing a fuel gas from the gas inlet can be introduced into the housing green body, in particular into a lateral surface of the housing green body. Machining of the housing green body can be carried out with simple tools and is therefore significantly less expensive compared with machining of the ceramics end product.

In addition or alternatively, the insert body can also be machined prior to baking. For example, the insert body can be machined prior to baking in order to adapt the shape of the insert body particularly precisely to the shape of the housing green body. It will be appreciated that machining of the insert body can be carried out particularly simply and inexpensively when the insert body is an insert green body.

The housing green body and the insert body are preferably baked at a temperature of 1700° C.

By means of the joint baking of the housing green body and the insert green body, the insert is seated in the housing without a gap and/or without additional material.

The housing is preferably produced from an aluminum oxide material, in particular AL300®. The insert is preferably produced from an aluminum oxide material, in particular AL1009® or aluminum-oxide-based HalFoam™. AL1009® is particularly suitable for the production of an insert which is manufactured from an insert body in the form of an insert green body and is sintered by being baked jointly with the housing green body to form an insert having the desired geometry and pore structure. By contrast, aluminum-oxide-based HalFoam™ can be used to produce an insert from a pre-baked insert body whose geometry and pore structure remain substantially the same when it is baked jointly with the housing green body.

An ion thruster comprises a gas inlet described above.

BRIEF DESCRIPTION OF THE DRAWINGS

A preferred embodiment of the invention will now be described in greater detail with reference to the accompanying diagrammatic drawing, in which A preferred embodiment of the invention will now be described in greater detail with reference to the accompanying diagrammatic drawing, in which.

DETAILED DESCRIPTION OF THE DRAWINGS

Figure 1:
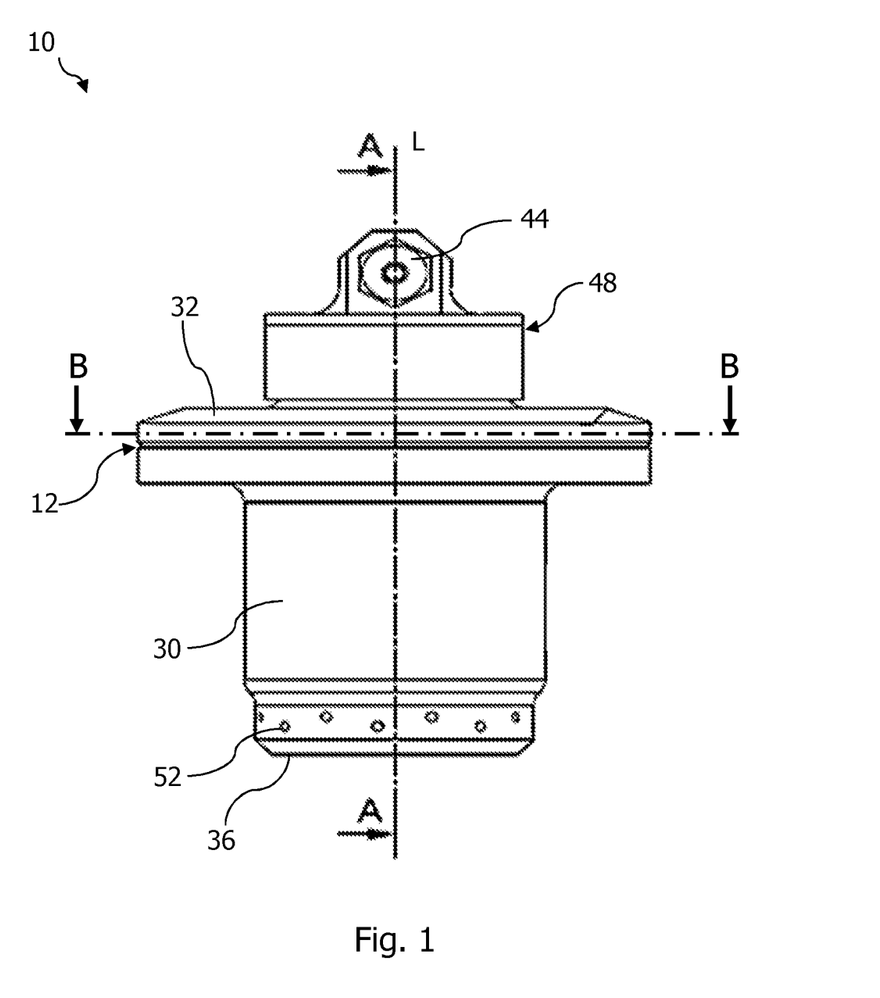
FIG. 1 is a side view of a gas inlet, in particular for use in an ion thruster.
Figure 2:
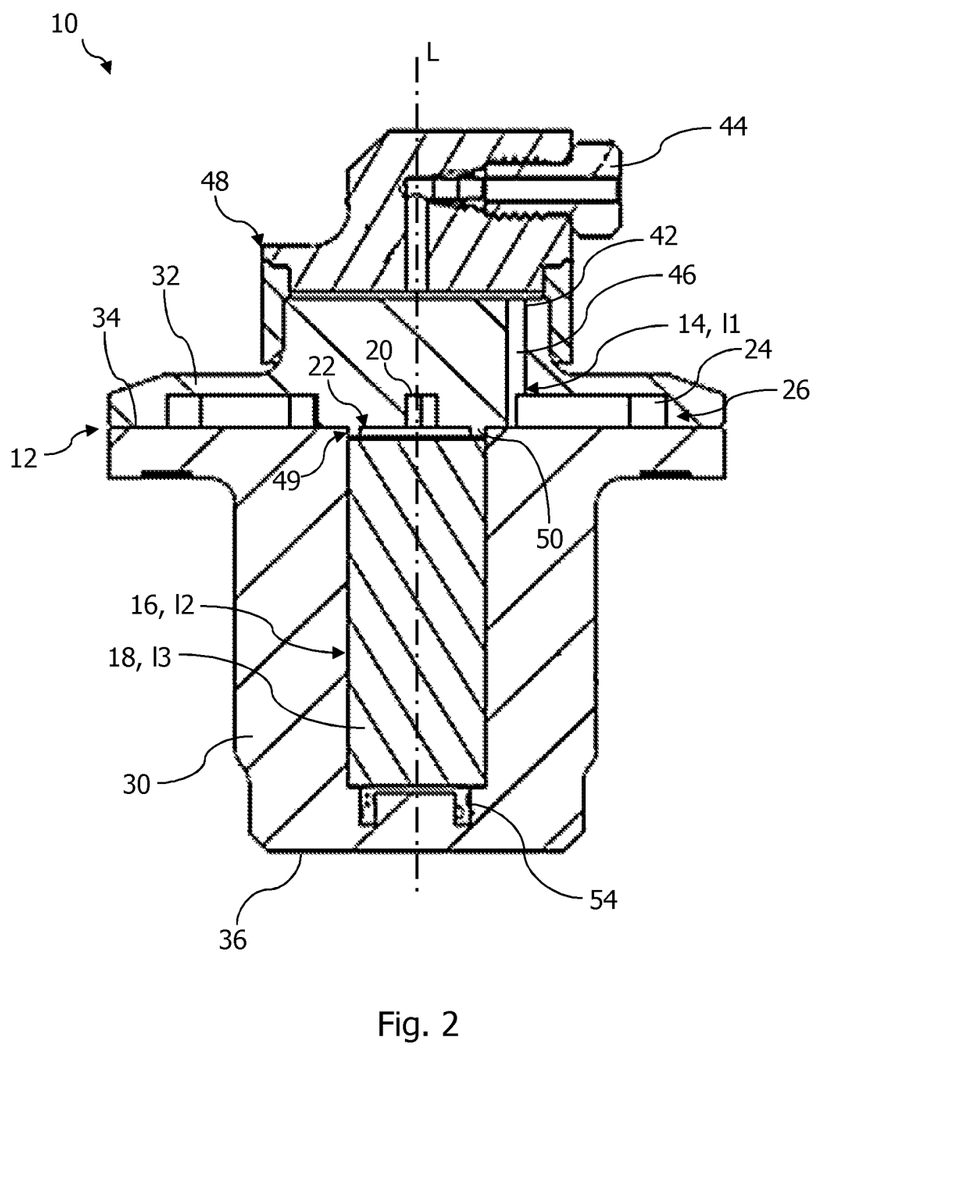
FIG. 2 is a cutaway view along a cutting plane A-A of the gas inlet shown in FIG. 1.

A gas inlet 10 which is shown in FIGS. 1 to 4 and is suitable for use in an ion thruster comprises a housing 12 made of a gas-tight ceramics material. As is shown in FIG. 2, the housing 12 is provided with a first gas feed channel 14 and a second gas feed channel 16 arranged downstream of the first gas feed channel 14. The gas inlet 10 further comprises an insert 18 arranged in the second gas feed channel 16, which insert is made of a porous ceramics material and is in one piece. The insert 18 is of cylindrical shape, which is matched to the shape of the second gas feed channel 16 in the form of a hollow cylinder. The second gas feed channel 16 and the insert 18 are in such a form that their longitudinal central axes coincide with a longitudinal axis L of the gas inlet 10. The geometry and pore structure of the insert 18 made of a porous ceramics material are such that the insert 18 forms a desired flow resistance for a gas stream flowing through the second gas feed channel 16 which is greater than a flow resistance acting on a gas stream flowing through the first gas feed channel 14. As can be seen in FIG. 2, the insert 18 is seated in the second gas feed channel 16 of the housing 12 without a gap, that is to say the insert 18 abuts an inner surface of the second gas feed channel 16 at least in the region of its lateral surface. In addition, the insert 18 is seated in the housing 12 without additional materials, such as, for example, adhesives or glazes. The gas inlet 10 is in such a form that a ratio of a length 11 of the first gas feed channel 14 to a length 13 of the insert 18 is greater than 1:2. The length of the insert 13 thereby corresponds substantially to a length 12 of the second gas feed channel 16.

In the embodiment of the gas inlet 10 shown here, the gas-tight housing 12 is made of an aluminum oxide material, for example AL300® from Wesgo Ceramics GmbH. The insert 18 is likewise made of an aluminum oxide material, but of a porous aluminum oxide material. In particular, the insert 18 can be made of the material AL1009® from Wesgo Ceramics GmbH and can have a porosity of approximately from 16 to 22 vol. %. Alternatively, the insert can also be manufactured from the material aluminum-oxide-based HalFoam™ supplied by Morgan Advanced Materials. The insert 18 then has a porosity of approximately from 70 to 90 vol. %, preferably of 77 vol. % at a mean pore size of 75 μm.

Figure 4:
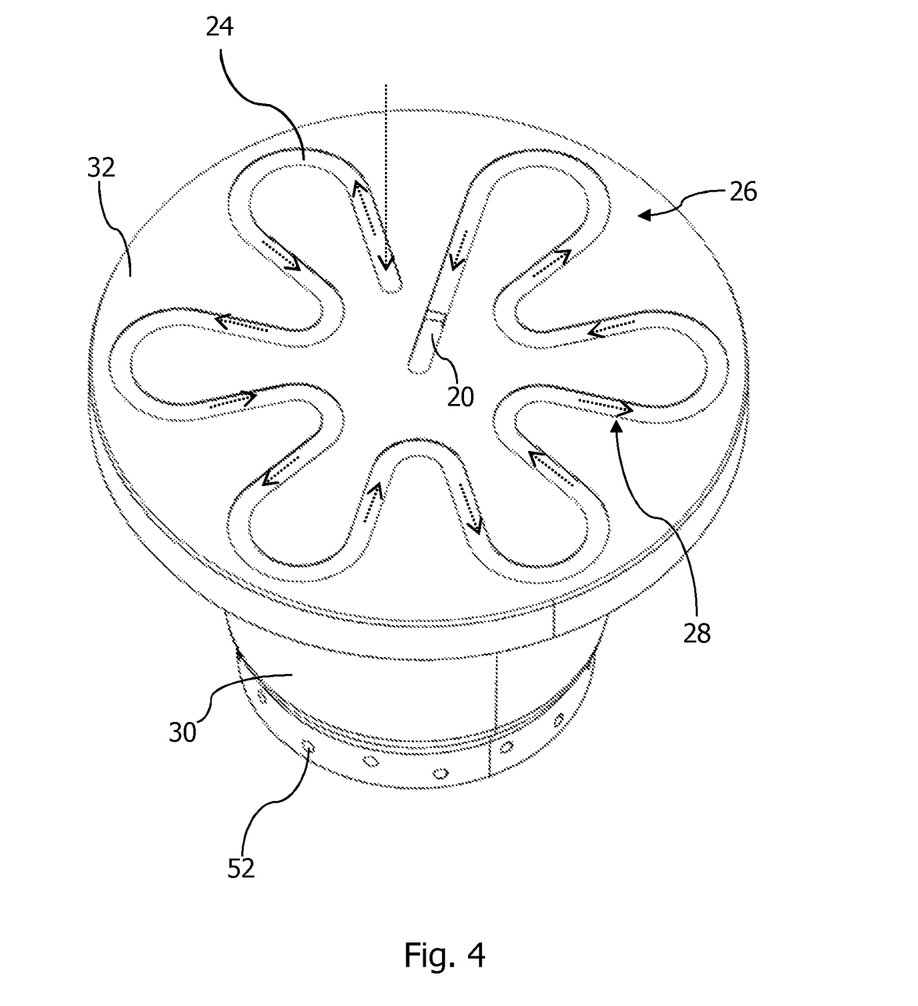
FIG. 4 is a three-dimensional cutaway view along a cutting plane B-B of the gas inlet shown in FIG. 1.
Figure 5:
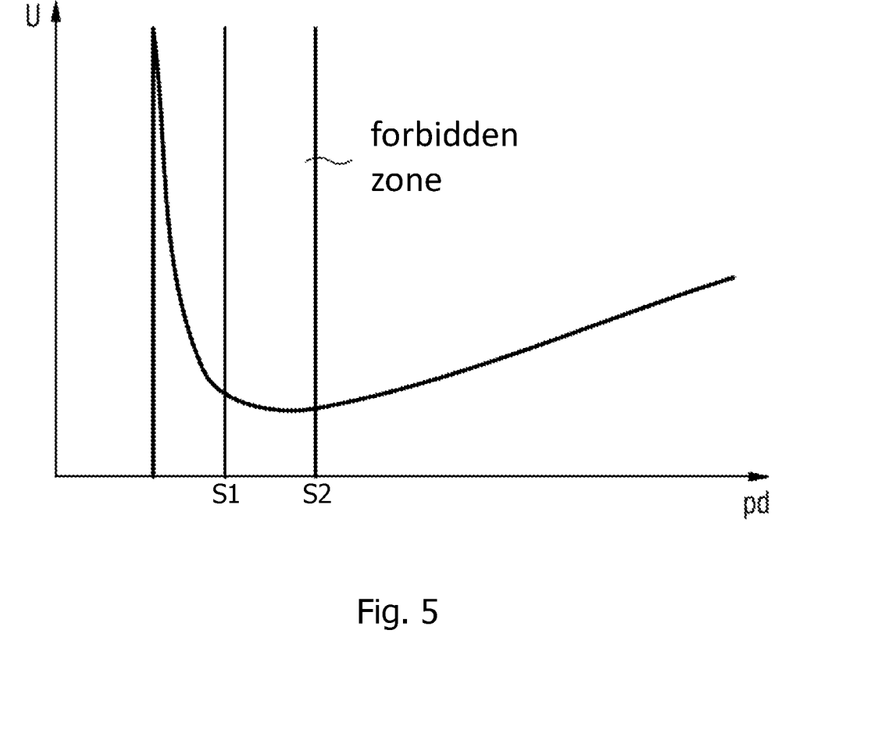
FIG. 5 is a graphic representation of the relationship between a breakdown voltage U and a product of a gas pressure p of the gas stream flowing through the gas inlet and an electrode gap d of the gas inlet.

Regardless of the material used to produce the housing 12 and the insert 18, the design parameters of the gas inlet 10, in particular of the first gas feed channel 14, the second gas feed channel 16 and the insert 18, are adapted using Paschen's law, which describes the dependency of the breakdown voltage U in a homogeneous field on a product of gas pressure p and electrode gap d. A graphic representation of this relationship is illustrated in FIG. 5. In particular, the first gas feed channel 14, the second gas feed channel 16 and the insert 18 are in such a form that, at a given breakdown voltage U, a product of a pressure drop p in the gas stream flowing through the gas inlet 10 and an electrode gap d formed by a sum of the length 11 of the first gas feed channel 14 and the length 12 of the second gas feed channel 16, that is to say a wavelength of the gas stream through the gas inlet 10, lies within a predetermined range. In the embodiment shown in FIGS. 1 to 4, the electrode gap is in the region of 210 mm. Furthermore, the first gas feed channel 14 and the second gas feed channel 16 have such a geometry and such properties, such as, for example, a defined surface structure at the inner surfaces thereof that are in contact with the gas stream flowing through the gas inlet 10, and the insert 18 has such a geometry and such a pore structure that a desired pressure drop p is generated in the gas stream flowing through the gas inlet 10. In the embodiment shown here, the pressure drop p so generated in the gas stream flowing through the gas inlet 10 can be in the region of 300 mbar.

The given breakdown voltage U is preferably chosen to be as great as possible. In particular, the first gas feed channel 14, the second gas feed channel 16 and the insert 18 are in such a form that, at a given breakdown voltage U, the product of the pressure drop p in the gas stream flowing through the gas inlet 10 and the electrode gap d formed by the sum of the length 11 of the first gas feed channel 14 and the length 12 of the second gas feed channel 16 is either less than a lower threshold value S1 or greater than an upper threshold value S2. The lower threshold value S1 and the upper threshold value S2 span a range in the curve according to FIG. 5 graphically representing Paschen's law which is described as the "forbidden zone". The range of the product of the pressure drop p in the gas stream flowing through the gas inlet 10 and the electrode gap d formed by the sum of the length 11 of the first gas feed channel 14 and the length 12 of the second gas feed channel 16 that lies, at a given breakdown voltage U, between the lower threshold value S1 and the upper threshold value S2 is a range that is suitable for permitting ignition of a fuel gas fed to the ion thruster by means of the gas inlet 10.

As is shown in FIG. 2, the first gas feed channel 14 opens into the second gas feed channel 16. The fuel to be fed to the gas inlet 10 can thus be fed to the second gas feed channel 16 and the insert 18 arranged therein via the first gas feed channel 14. For this purpose, the first gas feed channel 14 has a gas outlet opening 20 for removing a fuel gas from the first gas feed channel 14, via which the fuel gas leaving the first gas feed channel 14 can be fed to the second gas feed channel 16. The gas outlet opening 20 of the first gas feed channel 14 is arranged concentrically to the second gas outlet opening 16 and the insert 18 arranged therein. As is further shown in FIG. 2, a gap 22 extends between the gas outlet opening 20 of the first gas feed channel 14 and the insert 18. The gap 22 ensures that the fuel gas to be guided into the second gas feed channel 16 can be fed to the insert 18 arranged in the second gas feed channel 16 evenly over substantially its entire flow cross-section.

In the gas inlet 10 according to FIGS. 1 to 4, the ratio of the length 11 of the first gas feed channel 14 to the length 13 of the insert 18 is substantially 6:1. Specifically, the length 11 of the first gas feed channel 14 is substantially 180 mm and the length 13 of the insert 18 is substantially 30 mm.

Figure 3:
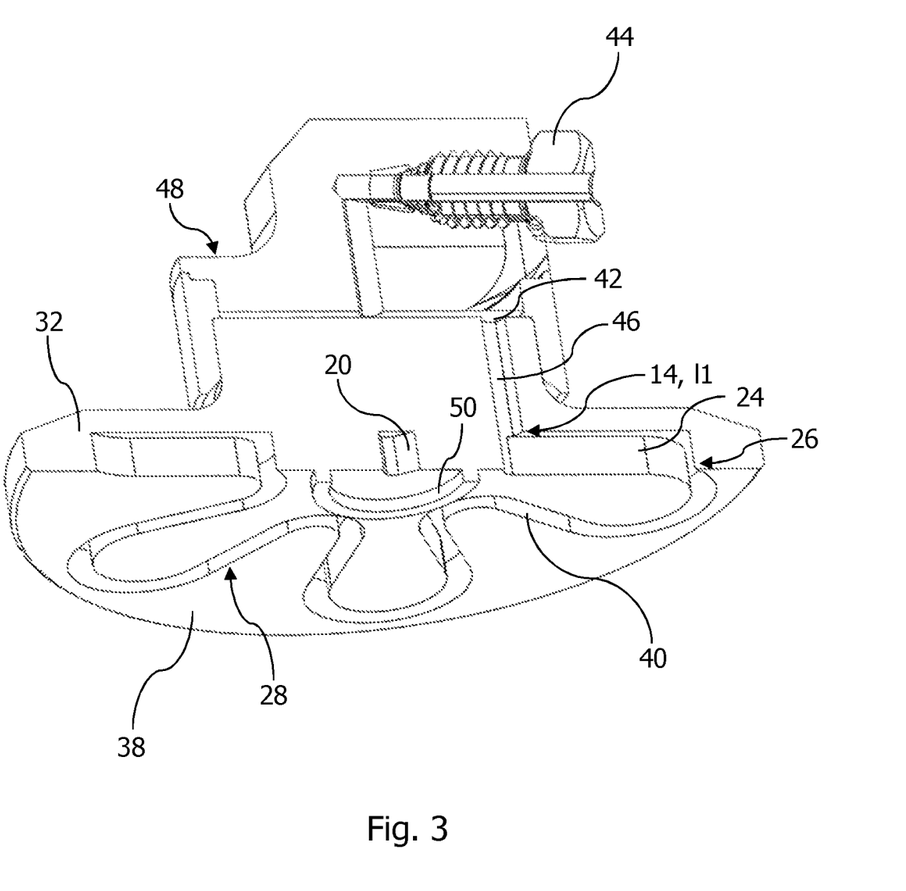
FIG. 3 is a three-dimensional cutaway view along the cutting plane A-A of a housing cover of the gas inlet shown in FIGS. 1 and 2.

In order to ensure a space-optimized form of the gas inlet 10, the first gas feed channel 14 is bent in the housing 12. The first gas feed channel 14 is in such a form that the gas stream flowing through the first gas feed channel 14 flows in part substantially perpendicularly to the longitudinal axis L of the gas inlet 10. Specifically, the first gas feed channel 14 has a first section 24 which defines a flow plane 26 having a plurality of bent flow sections 28. The flow plane 26 is arranged substantially perpendicularly to the longitudinal axis L of the gas inlet 10. The first gas feed channel 14, in particular the first section 24 of the gas feed channel 14, is in such a form that the gas stream flowing along the flow plane 26 in the first gas feed channel 14 is diverted several times, so that it changes its direction of flow relative to the longitudinal axis L of the gas inlet 10, that is to say its direction of flow within the flow plane 26, several times. As is shown in FIGS. 3 and 4, the first section 24 of the first gas feed channel 14 specifically has a meandering geometry. Accordingly, flow sections 28 running substantially parallel to one another in the flow plane 26 are in such a form that the gas stream flowing through the first section 24 of the first gas feed channel 14 flows through it in opposite directions, as indicated in FIG. 4 by dotted lines. In an alternative embodiment of the gas inlet 10, the first gas feed channel 14 can have a plurality of sections connected one behind the other, each of which defines a flow plane having meandering flow sections. A plurality of flow planes "stacked one above the other", each having meandering flow sections, can thereby be produced.

The housing 12 comprises a housing base body 30 and a housing cover 32 fitted thereto. The housing base body 30 has a first end face 34 and a second end face 36 arranged opposite thereto, which end faces are arranged perpendicularly to the longitudinal axis L of the gas inlet 10. In the region of the second end face 36, the housing base body 30 is provided with a bottom. In the region of the first end face 34, on the other hand, the housing base body 30 is open. As is shown in FIGS. 1 and 2, the housing cover 32 is fitted to the first end face 34 of the housing base body 30, so that an end face 38 of the housing cover 32 rests on the first end face 34 of the housing base body 30. The housing cover 32 can be fitted to the housing base body 30 by glazing or adhesive bonding.

The first gas feed channel 14 is formed in part in the housing cover 32. Specifically, the housing cover 32 is provided along its end face 38 with a groove 40 which, together with the first end face 34 of the housing base body 30, on which the end face 38 of the housing cover 32 rests, forms the first section 24 of the first gas feed channel 14, which defines the flow plane 26. The housing cover 32 is further provided with a gas inlet opening 42 for feeding the fuel gas from a fuel line 44 into the first gas feed channel 14. The gas inlet opening 42 of the housing cover 32 is connected via a second section 46 of the first gas feed channel 14 to the first section 24 of the first gas feed channel 14 forming the flow plane 26. The second section 46 of the first gas feed channel 14 extends towards the longitudinal axis L of the gas inlet 10 and is arranged offset relative thereto. A metallic attachment 48 which connects the gas inlet opening 42 of the housing cover 32 to the metallic fuel line 44 is fitted to the housing cover 32, so that fuel gas leaving the fuel line 44 can be fed into the first gas feed channel 14.

The second gas feed channel 16 is formed in the housing base body 30. The first end face 34 of the housing base body 30 is provided with a gas inlet opening 49 of the second gas feed channel 16, via which the fuel gas leaving the gas outlet opening 20 of the first gas feed channel 14 can be fed to the second gas feed channel 16. The housing cover 32 is so fitted to the first end face 34 of the housing base body 30 that it rests thereon without a gap. The housing cover 32 has on its end face 38 an annular projection 50 which projects into the housing base body 30, the projection 50 resting with its outer lateral surface on the inner surface of the second gas feed channel 16. In this manner, the gap 22 within the projection 50 is formed.

The housing base body 30 is further provided with a plurality of gas outlet openings 52 for removing the fuel gas from the gas inlet 10. The gas outlet openings 52 are connected to the second gas feed channel 16 via an annular channel 54. Through the gas outlet openings 52, fuel gas which has been fed to the gas inlet 10 via the gas inlet opening 42 of the housing cover 32 can be discharged, after it has flowed through the insert 18, from the gas inlet 10 in a defined manner into a reaction chamber of an ion thruster equipped with the gas inlet 10. The gas outlet openings 52 are arranged in the region of an edge of the housing base body 30 opposite the housing cover 32. Specifically, the gas outlet openings 52 are positioned in a lateral surface of the housing 12 adjacent to the second end face 36 of the housing base body 30. The gas outlet openings 52 are distributed evenly in the peripheral direction of the lateral surface of the housing 12, in order to ensure that the fuel gas is fed particularly evenly into the reaction chamber of the ion thruster.

Figure 6:
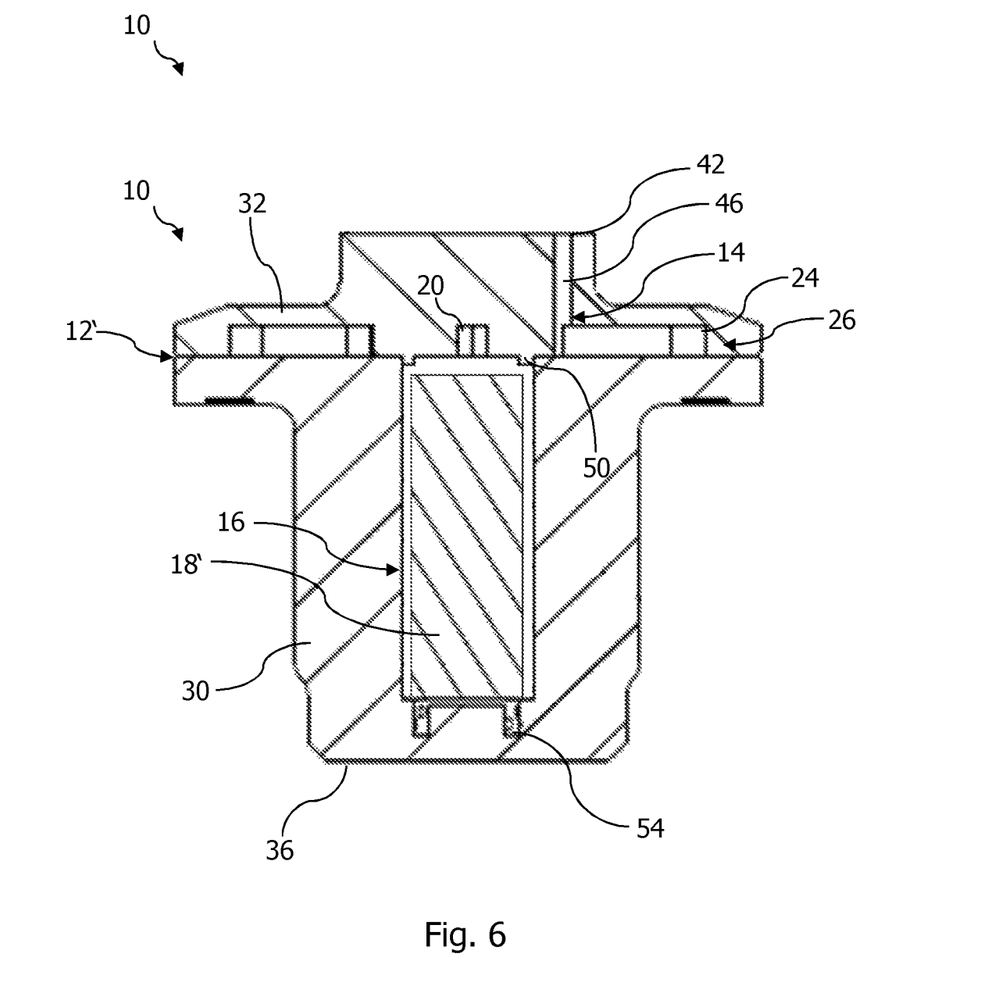
FIG. 6 is a three-dimensional cutaway view of a pre-product for the production of the gas inlet shown in FIGS. 1 to 4 having an insert green body inserted in a housing green body.

In order to produce the gas inlet 10 shown in FIGS. 1 to 4, a housing green body 12' illustrated in FIG. 6 is first produced, which housing green body is provided with a first gas feed channel 14 and a second gas feed channel 16 arranged downstream of the first gas feed channel 14. An insert body 18' likewise shown in FIG. 6 is further produced. The housing green body 12' is produced by cold isostatic pressing of the raw material, that is to say AL300® in powder form.

The insert body 18' can be an insert green body. The insert body 18' in the form of an insert green body is then produced by cold isostatic pressing of the raw material AL1009® in powder form.

As required, the housing green body 12' and the insert body 18' can be machined. In addition to the first and second gas feed channels 14, 16, in particular the gas outlet openings 52 are introduced into the housing green body 12'. The insert green body 18' is then inserted into the housing green body 12', whereby the pre-product shown in FIG. 6 is obtained.

Finally, the housing green body 12' and the insert green body 18' are jointly baked, wherein the baking cycle is so chosen that the housing green body 12' sinters to form a housing 12 made of a gas-tight ceramics material, whereas the insert green body 18' sinters to form an insert 18 arranged in the housing 12 and made of a porous ceramics material. In particular, the housing green body 12' and the insert green body 18' are baked at a temperature of 1700° C. After baking, the geometry and pore structure of the insert 18 are such that the insert 18 forms a desired flow resistance for a gas stream flowing through the second gas feed channel 16 which is greater than a flow resistance acting on a gas stream flowing through the first gas feed channel 14. There is thereby formed a gas inlet 10 in which a ratio of a length 11 of the first gas feed channel 14 to a length 13 of the insert 18 is greater than 1:2.

Alternatively, the insert body 18' can be a pre-baked insert body 18' whose geometry and pore structure remain substantially the same when the housing green body 12' and the insert body 18' are jointly baked. To produce an insert 18 from a pre-baked insert body 18' whose geometry and pore structure remain substantially the same during joint baking with the housing green body 12', aluminum-oxide-based HalFoam™ can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas inlet for use in an ion thruster, wherein the gas inlet comprises:
    a housing made of a gas-tight ceramics material having a first gas feed channel and a second gas feed channel arranged downstream of the first gas feed channel; and
    an insert arranged in the second gas feed channel and made of a porous ceramics material,
    wherein the insert is arranged downstream of the first gas feed channel, wherein a geometry and pore structure of the insert are such that the insert forms a desired flow resistance for a gas stream flowing through the second gas feed channel which is greater than another flow resistance acting on a gas stream flowing through the first gas feed channel,
    wherein a ratio of a length of the first gas feed channel to a length of the insert is at least 1:2, wherein the first gas feed channel defines a flow plane having at least one bent flow section, and wherein the first gas feed channel is in such a form that the gas stream flowing through the first gas feed channel along the flow plane is diverted several times within the flow plane, so that the gas stream flowing through the first gas feed channel along the flow plane changes a direction of flow of the gas stream flowing through the first gas feed channel along the flow plane, relative to a longitudinal axis of the gas inlet, several times.

2. The gas inlet as claimed in claim 1, wherein the first gas feed channel, the second gas feed channel and the insert are configured such that, at a given breakdown voltage, a product of a pressure drop in a gas flowing through the gas inlet and an electrode gap formed by a sum of the length of the first gas feed channel and a length of the second gas feed channel lies within a predetermined range.

3. The gas inlet as claimed in claim 2, wherein, at the given breakdown voltage, the product is either smaller than a lower threshold value or greater than an upper threshold value.

4. The gas inlet as claimed in claim 2, wherein the predetermined range of the product is suitable for permitting ignition of the gas fed to the ion thruster by means of the gas inlet.

5. The gas inlet as claimed in claim 1, wherein at least one of (i) the first gas feed channel opens into the second gas feed channel, and (ii) the ratio is 6:1.

6. The gas inlet as claimed in claim 1, wherein the first gas feed channel is bent in the housing, and wherein the gas stream flowing through the first gas feed channel flows at least in part perpendicularly to the longitudinal axis.

7. The gas inlet as claimed in claim 6, wherein the flow plane is perpendicular to the longitudinal axis.

8. The gas inlet as claimed in claim 1, wherein the housing comprises:
    a housing cover in which the first gas feed channel is formed at least in part and which comprises a gas inlet opening configured to feed a gas from a fuel line into the first gas feed channel; and
    a housing base body in which the second gas feed channel is formed and which comprises at least one gas outlet opening, connected to the second gas feed channel, and which is configured to remove the gas from the gas inlet, wherein at least one of (i) the at least one gas outlet opening is formed in a lateral surface of the housing base body, and (ii) the at least one gas outlet opening is arranged in a region of an edge of the housing base body opposite the housing cover.

9. The gas inlet as claimed in claim 1, wherein at least one of the housing and the insert is made of an aluminum oxide material.

10. An ion thruster having a gas inlet, wherein the gas inlet comprises:
    a housing made of a gas-tight ceramics material having a first gas feed channel and a second gas feed channel arranged downstream of the first gas feed channel; and
    an insert arranged in the second gas feed channel and made of a porous ceramics material,
    wherein the insert is arranged downstream of the first gas feed channel, wherein a geometry and pore structure of the insert are such that the insert forms a desired flow resistance for a gas stream flowing through the second gas feed channel which is greater than another flow resistance acting on a gas stream flowing through the first gas feed channel, and wherein a ratio of a length of the first gas feed channel to a length of the insert is at least 1:2, wherein the first gas feed channel defines a flow plane having at least one bent flow section, and wherein the first gas feed channel is in such a form that the gas stream flowing through the first gas feed channel along the flow plane is diverted several times within the flow plane, so that the gas stream flowing through the first gas feed channel along the flow plane changes a direction of flow of the gas stream flowing through the first gas feed channel along the flow plane relative to a longitudinal axis of the gas inlet several times.

* * * * *